(12) United States Patent
Hata et al.

(10) Patent No.: US 11,533,841 B2
(45) Date of Patent: Dec. 27, 2022

(54) ELECTRIC WORKING MACHINE AND METHOD FOR CONTROLLING MOTOR OF ELECTRIC WORKING MACHINE

(71) Applicant: MAKITA CORPORATION, Anjo (JP)

(72) Inventors: Tatsuya Hata, Anjo (JP); Hiroshi Nojiri, Anjo (JP); Yoshitaka Ichikawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 255 days.

(21) Appl. No.: 16/778,276

(22) Filed: Jan. 31, 2020

(65) Prior Publication Data

US 2020/0260643 A1 Aug. 20, 2020

(30) Foreign Application Priority Data

Feb. 18, 2019 (JP) .............................. JP2019-026395

(51) Int. Cl.
| | |
|---|---|
| *A01D 34/73* | (2006.01) |
| *A01D 34/78* | (2006.01) |
| *A01G 3/06* | (2006.01) |
| *A01D 34/416* | (2006.01) |
| *A01D 34/90* | (2006.01) |
| *A01D 34/82* | (2006.01) |

(52) U.S. Cl.
CPC ......... *A01D 34/73* (2013.01); *A01D 34/4168* (2013.01); *A01D 34/78* (2013.01); *A01D 34/82* (2013.01); *A01D 34/90* (2013.01); *A01G 3/067* (2013.01)

(58) Field of Classification Search
CPC ...... A01D 34/78; A01D 34/90; A01D 34/416; A01D 34/6806; A01D 2101/00; B25F 5/001; B25F 3/00; B25F 5/00
USPC .................................... 30/276; 83/76, 58, 62
See application file for complete search history.

(56) References Cited

U.S. PATENT DOCUMENTS

| | | | |
|---|---|---|---|
| 6,616,446 B1 * | 9/2003 | Schmid .............. | B23Q 17/0957 433/224 |
| 9,991,825 B1 | 6/2018 | Ackerman et al. | |
| 10,206,329 B2 | 2/2019 | Alexandersson et al. | |
| 10,630,227 B2 | 4/2020 | Trinkle et al. | |

(Continued)

FOREIGN PATENT DOCUMENTS

| CN | 205232798 U | 5/2016 |
|---|---|---|
| CN | 205694280 U | 11/2016 |

(Continued)

OTHER PUBLICATIONS

Jul. 11, 2022 Office Action issued in Chinese Patent Application No. 202010057196.3.

(Continued)

*Primary Examiner* — Ghassem Alie
(74) *Attorney, Agent, or Firm* — Oliff PLC

(57) ABSTRACT

One aspect of the present disclosure provides an electric working machine. The electric working machine includes a driver, a motor, and a control circuit. Attached to the driver is a selected tool. The motor drives the selected tool attached to the driver. The control circuit sets a target rotational frequency based on the selected tool. The control circuit controls the motor to rotate at the target rotational frequency.

18 Claims, 14 Drawing Sheets

(56) References Cited

U.S. PATENT DOCUMENTS

| | | | |
|---|---|---|---|
| 2009/0228137 A1* | 9/2009 | Meidar | B23Q 17/002 29/407.05 |
| 2012/0138322 A1 | 6/2012 | Neubauer et al. | |
| 2013/0205596 A1 | 8/2013 | Pellenc | |
| 2014/0083375 A1 | 3/2014 | Kawashima et al. | |
| 2014/0165525 A1 | 6/2014 | Nagata | |
| 2014/0295755 A1* | 10/2014 | Graf | H04B 5/0037 307/104 |
| 2014/0352995 A1* | 12/2014 | Matsunaga | H02P 7/245 173/179 |
| 2015/0174674 A1* | 6/2015 | Terashima | B23D 59/001 83/471.2 |
| 2016/0021819 A1 | 1/2016 | Nakano et al. | |
| 2016/0227694 A1 | 8/2016 | Bermudez | |
| 2017/0043470 A1 | 2/2017 | Kong | |
| 2017/0264219 A1 | 9/2017 | Takeda | |
| 2018/0099394 A1* | 4/2018 | Ichikawa | B25D 17/043 |
| 2018/0116104 A1 | 5/2018 | Alexandersson et al. | |
| 2019/0217459 A1 | 7/2019 | Gregorich et al. | |
| 2019/0280639 A1* | 9/2019 | Trinkle | A01G 3/086 |
| 2019/0308309 A1 | 10/2019 | Gregorich et al. | |
| 2020/0078920 A1 | 3/2020 | Ikeda | |
| 2020/0346335 A1 | 11/2020 | Yang et al. | |

FOREIGN PATENT DOCUMENTS

| | | |
|---|---|---|
| CN | 106664942 A | 5/2017 |
| CN | 106900269 A | 6/2017 |
| CN | 206274760 U | 6/2017 |
| JP | 2013165678 A | 8/2013 |
| JP | 2014233793 A | 12/2014 |
| JP | 6137467 B2 | 5/2017 |
| JP | 2018512119 A | 5/2018 |
| JP | 6357116 B2 | 7/2018 |
| WO | 2015161721 A1 | 10/2015 |

OTHER PUBLICATIONS

Aug. 24, 2022 Office Action issued in U.S. Appl. No. 16/787,140.
Aug. 30, 2022 Office Action issued in Japanese Patent Application No. 2019-026397.
Aug. 30, 2022 Office Action issued in Japanese Patent Application No. 2019-026395.

* cited by examiner

ELECTRIC WORKING MACHINE AND METHOD FOR CONTROLLING MOTOR OF ELECTRIC WORKING MACHINE

CROSS-REFERENCE TO RELATED APPLICATIONS

The present application claims the benefit of Japanese Patent Application No. 2019-026395 filed on Feb. 18, 2019 with the Japan Patent Office, entire disclosure of which is incorporated herein by reference.

BACKGROUND

The present disclosure relates to an electric working machine to which at least a first tool and a second tool are selectively attached.

Japanese Patent No. 6357116 discloses a brush cutter provided with an automatic speed shifting function by which a target rotational frequency of an electric motor is changed in two or more stages in accordance with a load imposed on the electric motor that drives a rotary blade. This brush cutter can rotate the rotary blade at a suitable rotational frequency in accordance with the load and reduce unnecessary power consumption.

SUMMARY

The above-described brush cutter is configured such that a metal blade and a nylon cord cutter are selectively attached. The target rotational frequency set by the automatic speed shifting function is suitable for one of the metal blade and the nylon cord cutter, but may not be suitable for the other. Thus, the effect of reducing power consumption has not been sufficiently achieved.

It is desirable that unnecessary power consumption can be reduced in an electric working machine according to one aspect of the present disclosure.

One aspect of the present disclosure provides an electric working machine. The electric working machine includes a driver, a motor, and/or a control circuit. To the driver, a selected tool is attached. The motor drives the selected tool attached to the driver. The control circuit sets a target rotational frequency based on the selected tool. The control circuit controls the motor to rotate at the target rotational frequency.

The electric working machine configured as described above can rotate the motor at a rotational frequency suitable for the selected tool. Accordingly, the electric working machine can inhibit an occurrence of a situation where the electric working machine rotates a first tool at the target rotational frequency that is suitable for a second tool but that is too high for the first tool, and electric power is unnecessarily consumed. The electric working machine thus can reduce unnecessary power consumption.

The target rotational frequency may correspond to a maximum rotational frequency of the motor for the selected tool. In this case, the rotational frequency of the motor can be limited depending on the selected tool. Accordingly, the electric working machine can inhibit an occurrence of a situation where the rotational frequency of the motor becomes unnecessarily high depending on the selected tool, and thus can further reduce unnecessary power consumption.

The selected tool may be selected at least from a metal blade and a nylon cord cutter. The maximum rotational frequency for the metal blade may be higher than the maximum rotational frequency for the nylon cord cutter. Noise generated by the nylon cord cutter becomes louder as the rotational frequency of the nylon cord increases. Thus, the noise can be reduced if the maximum rotational frequency for the nylon cord is reduced. Noise generated by the metal blade does not become as loud as noise generated by the nylon cord cutter even when the rotational frequency is increased. Accordingly, the maximum rotational frequency for the metal blade can be high, which in turn improves the working efficiency of the electric working machine.

The control circuit may change the target rotational frequency in accordance with a load imposed on the motor. The control circuit may detect the load imposed on the motor. The control circuit may set the target rotational frequency upon detection of the load. The target rotational frequency may be determined depending on the selected tool. In this case, the electric working machine can rotate the motor at the rotational frequency suitable for the selected tool while the load is imposed on the motor, and thus can reduce unnecessary power consumption.

The control circuit may set the target rotational frequency prior to detection of the load. The target rotational frequency may be determined depending on the selected tool. In this case, the electric working machine can rotate the motor at the rotational frequency suitable for the selected tool while the load is not imposed on the motor, and thus can reduce unnecessary power consumption.

The control circuit may set at least one parameter based on the selected tool. The at least one parameter may be associated with a change of the target rotational frequency depending on a state of the load. In this case, the electric working machine can suitably change the target rotational frequency depending on the selected tool, and thus can reduce unnecessary power consumption.

The at least one parameter may include a load imposed threshold for determining whether the load is imposed on the motor. The load imposed threshold set in response to the nylon cord cutter being attached to the driver may be larger than the load imposed threshold set in response to the metal blade being attached to the driver.

The at least one parameter may include a change confirmation time. The control circuit may change the target rotational frequency in response to fulfillment of a condition for change continuing for the change confirmation time. The condition for change may be set based on a magnitude of the load. The change confirmation time set in response to the metal blade being attached to the driver may be longer than the change confirmation time set in response to the nylon cord cutter being attached to the driver.

The at least one parameter may include a change disabled time. The control circuit may determine whether the condition for change is fulfilled in response to an elapse of the change disabled time. The change disabled time set in response to the metal blade being attached to the driver may be longer than the change disabled time set in response to the nylon cord cutter being attached to the driver.

The control circuit may change the target rotational frequency in a stage-by-stage manner in accordance with the load imposed on the motor. A total number of stages to change the target rotational frequency may vary depending on the selected tool.

The selected tool may be selected at least from the metal blade and the nylon cord cutter. The total number of stages for the metal blade may be larger than the total number of stages for the nylon cord cutter.

The control circuit may perform automatic shifting control and manual shifting control. The control circuit may change the target rotational frequency in the automatic shifting control based on a magnitude of the load. The control circuit may change the target rotational frequency in the manual shifting control based on operation of the electric working machine by a user of the electric working machine. The automatic shifting control may include more stages to change the target rotational frequency than the manual shifting control. The above-described electric working machine can facilitate rotation of the motor at the suitable rotational frequency in accordance with the load in the automatic shifting control, and reduce the trouble of selecting the target rotational frequency for the user in the manual shifting control.

The control circuit may identify a type of the selected tool based on a value of an electric current flowing through the motor.

Another aspect of the present disclosure provides a method for controlling a motor of an electric working machine including: identifying a tool attached to a driver of the electric working machine based on a magnitude of an electric current flowing through the motor, the tool being driven by the motor; setting a target rotational frequency of the motor based on a result of identification of the tool; and/or driving the motor to rotate at the target rotational frequency.

According to the aforementioned method, unnecessary power consumption can be reduced in an electric working machine.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

Figure 1:
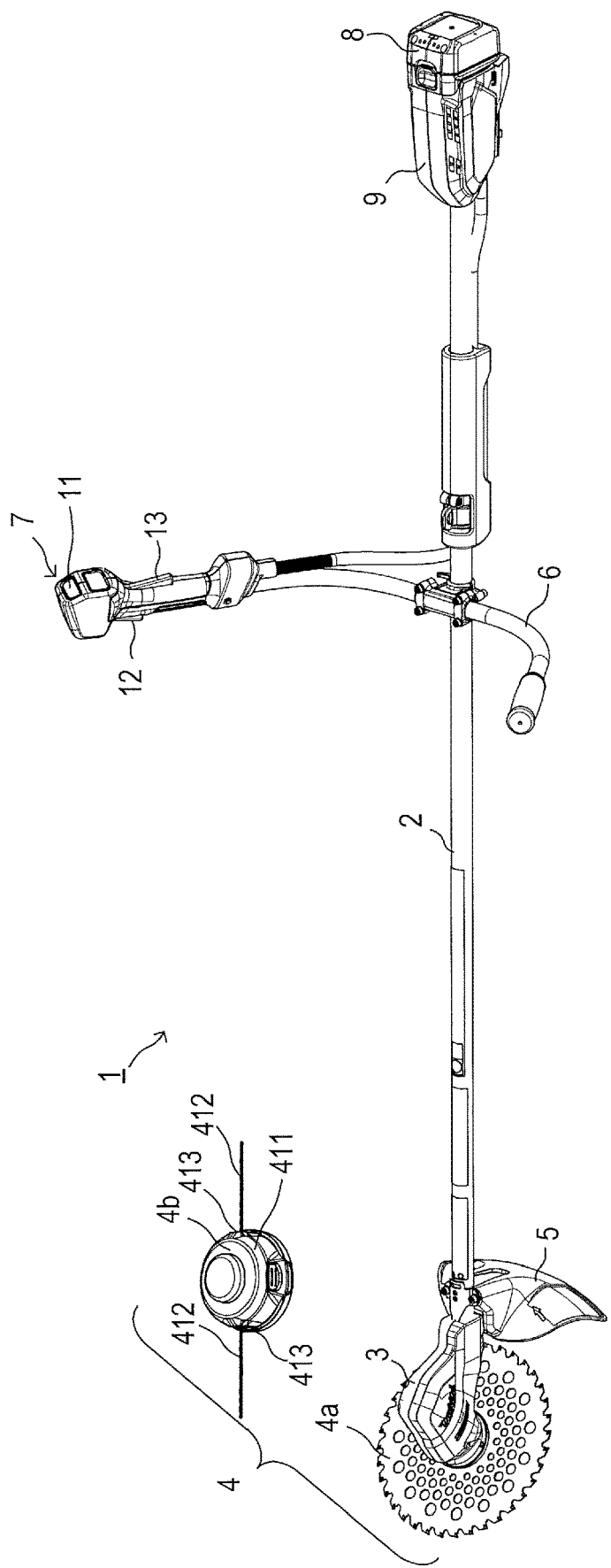
FIG. 1 is a perspective view showing an overall configuration of a grass cutter.

The present embodiment discloses a grass cutter 1. As shown in FIG. 1, the grass cutter 1 includes a main pipe 2, a driver 3, a tool 4 (or cutting tool, or rotary cutting blade), a cover 5, a handle 6, an operation device 7, a battery pack 8, and a controller 9.

The main pipe 2 is formed in a rod shape with a hollow. The driver 3 is mounted at a first end of the main pipe 2. The controller 9 is mounted at a second end of the main pipe 2.

The driver 3 includes a motor 20 (see FIG. 2) that is a drive source for rotationally driving the tool 4. The driver 3 includes a deceleration gear mechanism at a tip of a rotation shaft of the motor 20. The tool 4 is detachably attached to an output shaft of the gear mechanism. Accordingly, rotation of the motor 20 is transmitted to the output shaft via the gear mechanism, and the output shaft rotates together with the tool 4.

The tool 4 is selected from a metal blade 4a and a nylon cord cutter 4b in the present embodiment. That is, an operator (in other words, a user of the grass cutter 1) can select the metal blade 4a or the nylon cord cutter 4b and attach the selected tool to the driver 3. In FIG. 1, the metal blade 4a is attached to the driver 3. The metal blade 4a or the nylon cord cutter 4b is rotated to cut grass, trees with small diameters, and so on.

The metal blade 4a include a metal material and formed in a disc-shape. The metal blade 4a is provided with teeth along the rim of the metal blade 4a. The teeth are formed like those of a saw blade.

The nylon cord cutter 4b includes a cylindrical spool 411 in which a nylon cord 412 is accommodated. The nylon cord cutter 4b attached to the output shaft of the driver 3 is rotated by the rotational driving force of the motor 20. The lateral surface of the spool 411 is provided with two holes 413 through which the nylon cord 412 is drawn out. As the spool 411 is rotated, the nylon cord 412 drawn out of these holes 413 hits and removes grass, for example.

The cover 5 is disposed in vicinity of the first end of the main pipe 2 to face the tool 4. The cover 5 inhibits grass and the like removed by the tool 4 from flying toward the operator.

The handle 6 is connected to the main pipe 2 in the vicinity of the center of the main pipe 2 in the longitudinal direction. The handle 6 is formed in a U-shape. The handle 6 is provided with grips at a first end and a second end of the handle 6 to be held by the operator.

The operation device 7 has a function to operate the grass cutter 1 in response to finger operation of the operator, and a function to display an operation state of the grass cutter 1. The operation device 7 is mounted on the grip at the first end of the handle 6.

The operation device 7 includes a display 11 that shows the operation state of the grass cutter 1. Moreover, the operation device 7 includes a trigger switch 12 and a lock-off switch 13. The trigger switch 12 is an operation switch operated by the operator to input a command for driving the motor 20 into the controller 9. The trigger switch 12 includes a tactile switch that is turned on only while the trigger switch 12 is pressed (or pulled) by the operator. The lock-off switch 13 is an operation switch for the operator to unlock the trigger switch 12.

The battery pack 8 is detachably attached to the controller 9 so as to supply a direct electric power to the controller 9.

Figure 2:
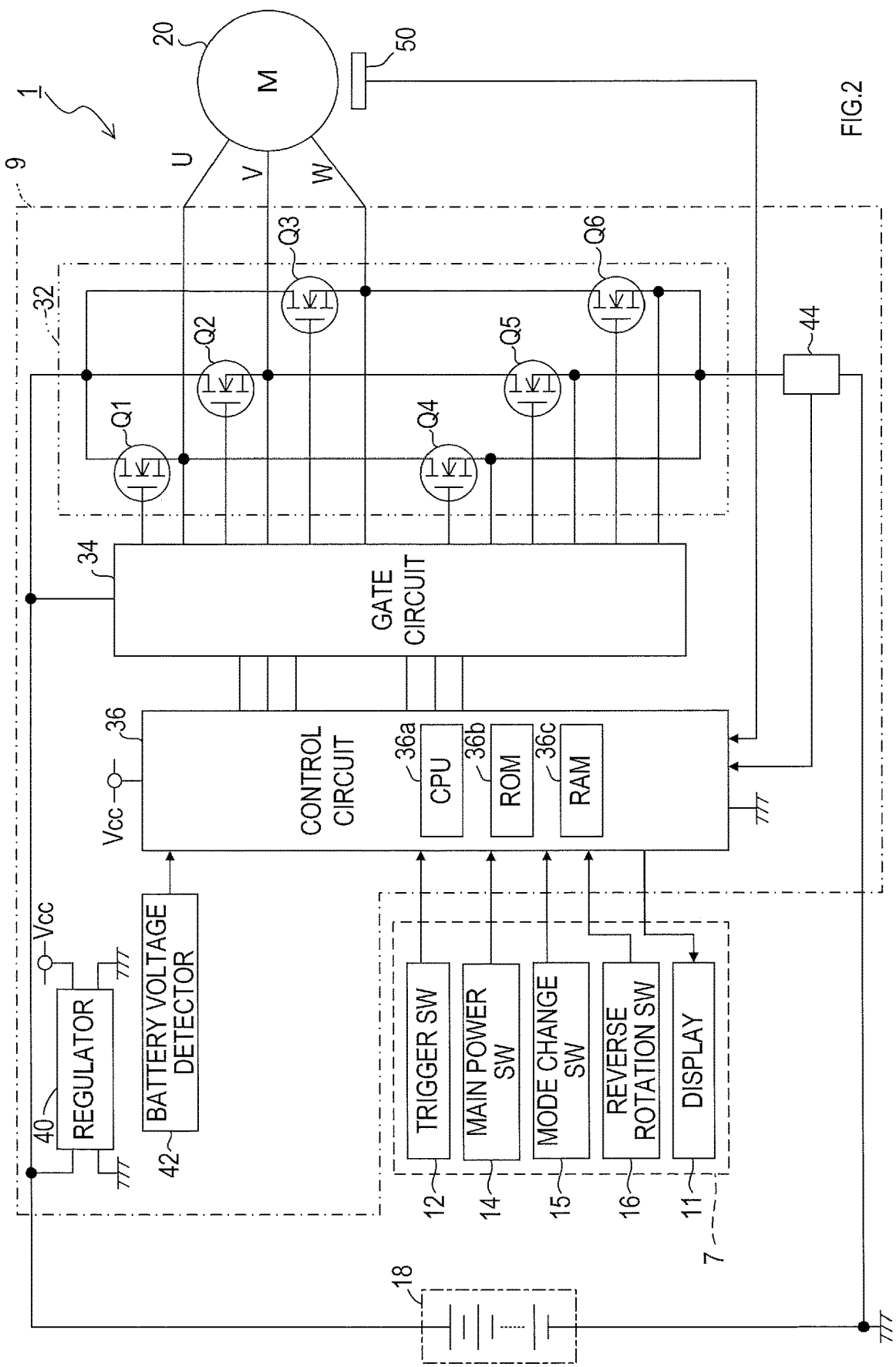
FIG. 2 is a block diagram showing an electrical configuration of the grass cutter.

As shown in FIG. 2, the controller 9 includes a drive circuit 32, a gate circuit 34, a control circuit 36, and a regulator 40. The controller 9 drives and controls the motor 20 with the direct electric power supplied from a battery 18 in the battery pack 8. In the present embodiment, the motor 20 is, but not limited to, a three-phase brushless motor.

The drive circuit 32 supplies an electric current from the battery 18 to phase windings of the motor 20. In the present embodiment, the drive circuit 32 includes a first to a sixth switching elements Q1 to Q6. The first to the sixth switching elements Q1 to Q6 form a three-phase full bridge circuit. In the present embodiment, the first to the sixth switching elements Q1 to Q6 are, but not limited to, metal oxide semiconductor field effect transistors (MOSFETs).

Sources of the first to the third switching elements Q1 to Q3 are respectively connected to terminals U, V, and W of the motor 20. Drains of the first to the third switching elements Q1 to Q3 are connected to a power supply line connected to the positive electrode of the battery 18. Drains of the fourth to the sixth switching elements Q4 to Q6 are respectively connected to the terminals U, V, and W of the motor 20. Sources of the fourth to the sixth switching elements Q4 to Q6 are connected to a ground line connected to the negative electrode of the battery 18.

The gate circuit 34 individually turns on or off the first to the sixth switching elements Q1 to Q6 in accordance with control signals outputted from the control circuit 36 so as to rotate or stop the motor 20. The control signals include pulse width modulation (PWM) signals.

In the present embodiment, the control circuit 36 is, but not limited to, a microcomputer including a CPU 36a, a ROM 36b, and a RAM 36c. Various functions of the control circuit 36 are implemented by programs stored in a non-transitory tangible storage medium in the present embodiment. The ROM 36b corresponds to one example of the non-transitory tangible storage medium in the present embodiment. In response to the CPU 36a executing the programs, processes respectively corresponding to the programs are performed. A part of or all of the functions executed by the CPU 36a may be achieved by a hardware, including at least one integrated circuit (IC), in place of or in addition to the CPU 36a. The control circuit 36 may include two or more microcomputers.

The controller 9 includes a battery voltage detector 42 and a current detection circuit 44. The battery voltage detector 42 detects a voltage value of the battery 18. The battery voltage detector 42 outputs a battery voltage detection signal indicating the voltage value of the battery 18 to the control circuit 36. The current detection circuit 44 detects a value of the electric current flowing through the motor 20 (hereinafter referred to as a load current value Im). The current detection circuit 44 outputs a current detection signal indicating the load current value Im to the control circuit 36.

The grass cutter 1 further includes a rotation sensor 50 that detects the rotational position and the rotational frequency of the motor 20.

The operation device 7 further includes a main power switch (SW) 14, a mode change switch 15, and a reverse rotation switch 16.

The main power switch 14 includes a tactile switch that is turned on only while the main power switch 14 is pressed by the operator. In the present embodiment, the main power switch 14 is operated in two ways. The first way is a long-press of the main power switch 14 by the operator for a given length of time (for example, two seconds) or longer. The second way is a short-press of the main power switch 14 by the operator for a length of time shorter than the given length of time.

Every time the main power switch 14 is long pressed, the control circuit 36 confirms that a main power source is turned on or turned off.

The main power switch 14 is also used to change a speed mode, which will be described later. The speed mode is changed by a short-press of the main power switch 14.

The mode change switch 15 is operated by the operator to set an operation mode of the grass cutter 1 to either a constant rotation mode or an automatic speed shifting mode. The mode change switch 15 includes a tactile switch that is turned on only while the mode change switch 15 is pressed by the operator.

The reverse rotation switch 16 is an operation switch to change the rotation direction of the motor 20 to a forward direction or a reverse direction. The forward direction corresponds to a direction in which the tool 4 cuts grass and so on. The reverse rotation switch 16 includes a tactile switch that is turned on only while the reverse rotation switch 16 is pressed by the operator.

The display 11, the trigger switch 12, the main power switch 14, the mode change switch 15, the reverse rotation switch 16, the battery voltage detector 42, the current detection circuit 44, and the rotation sensor 50 are connected to the control circuit 36.

The regulator 40 generates a power supply voltage Vcc based on the direct electric power supplied from the battery 18 so as to operate the control circuit 36, and supplies the power supply voltage Vcc to the internal circuits of the controller 9.

The regulator 40 is activated in response to the main power switch 14 being turned on, and starts supply the power supply voltage Vcc to the control circuit 36. In response to the supply of the power supply voltage Vcc being started, the control circuit 36 is activated and initiates a grass cutter control process.

The following describes the operation mode and the speed mode in the present embodiment.

The operation mode of the grass cutter 1 includes the constant rotation mode and the automatic speed shifting mode. The constant rotation mode is a mode in which the operator can fix the speed mode to a desired speed mode to operate the grass cutter 1. The automatic speed shifting mode is a mode in which the speed mode is automatically changed in accordance with the load imposed on the motor 20, more specifically, the rotation shaft of the motor 20.

In the constant rotation mode, one of a low speed mode, a medium speed mode, and a high speed mode can be selected. A commanded rotational frequency of the motor 20 in the low speed mode is the lowest among the three modes, whereas the commanded rotational frequency in the high speed mode is the highest.

The commanded rotational frequencies in the low speed mode, the medium speed mode, and the high speed mode for the metal blade 4a are respectively set to, but not limited to, 3500, 5500, and 7500 rpm in the present embodiment.

The commanded rotational frequencies in the low speed mode, the medium speed mode, and the high speed mode for the nylon cord cutter 4b are respectively set to, but not limited to, 3500, 4500, 5500 rpm in the present embodiment.

In the automatic speed shifting mode for the metal blade 4a, one of a first rotational frequency mode, a second rotational frequency mode, a third rotational frequency mode, a fourth rotational frequency mode, and a fifth rotational frequency mode can be selected. The commanded rotational frequency in the first rotational frequency mode is the lowest among the five modes, whereas the commanded rotational frequency in the fifth rotational frequency mode is the highest.

In the automatic speed shifting mode for the nylon cord cutter 4b, one of a sixth rotational frequency mode, a seventh rotational frequency mode, and an eighth rotational frequency mode can be selected. The commanded rotational frequency in the sixth rotational frequency mode is the lowest among the three modes, whereas the commanded rotational frequency in the eighth rotational frequency mode is the highest.

The commanded rotational frequencies of the first rotational frequency mode, the second rotational frequency mode, the third rotational frequency mode, the fourth rotational frequency mode, and the fifth rotational frequency mode are respectively set to, but not limited to, 3500, 4500, 5500, 6500, and 7500 rpm in the present embodiment.

The commanded rotational frequencies of the sixth rotational frequency mode, the seventh rotational frequency mode, and the eighth rotational frequency mode in the present embodiment are respectively set to, but not limited to, 3500, 4500, and 5500 rpm.

In the initial setting of the control circuit 36 when the control circuit 36 is activated, the operation mode is set to the constant rotation mode, and the speed mode is set to the high speed mode in the present embodiment.

While the operation mode is set to the constant rotation mode, the operator can short press the main power switch 14 to change the speed mode. Specifically, every time the main power switch 14 is turned on (ON-state), the speed mode is cyclically changed to a subsequent mode in the order of the high speed mode, the medium speed mode, and the low speed mode.

The operator can operate the mode change switch 15 so as to set the operation mode to the constant rotation mode or to the automatic speed shifting mode. Specifically, the operation mode is alternately changed between the constant rotation mode and the automatic speed shifting mode every time the mode change switch 15 is turned on.

In the present embodiment, if the operation mode is changed from the automatic speed shifting mode to the constant rotation mode, the speed mode is set to the high speed mode. Moreover, if the operation mode is changed from the constant rotation mode to the automatic speed shifting mode, the speed mode is set to the first rotational frequency mode. Subsequently, while the trigger switch 12 is in the ON-state and the motor 20 is rotated, a suitable speed mode is automatically set among from the first to the fifth rotational frequency modes in accordance with the load imposed on the motor 20.

The following describes an automatic speed shifting control performed by the control circuit 36 when the operation mode is set to the automatic speed shifting mode.

In the present embodiment, a first increase condition, a second increase condition, a third increase condition, a fourth increase condition, a first reduction condition, a second reduction condition, a third reduction condition, and a fourth reduction condition are specified as conditions for change on which the speed mode is automatically changed in a case where the metal blade 4a is attached to the driver 3.

Figure 3:
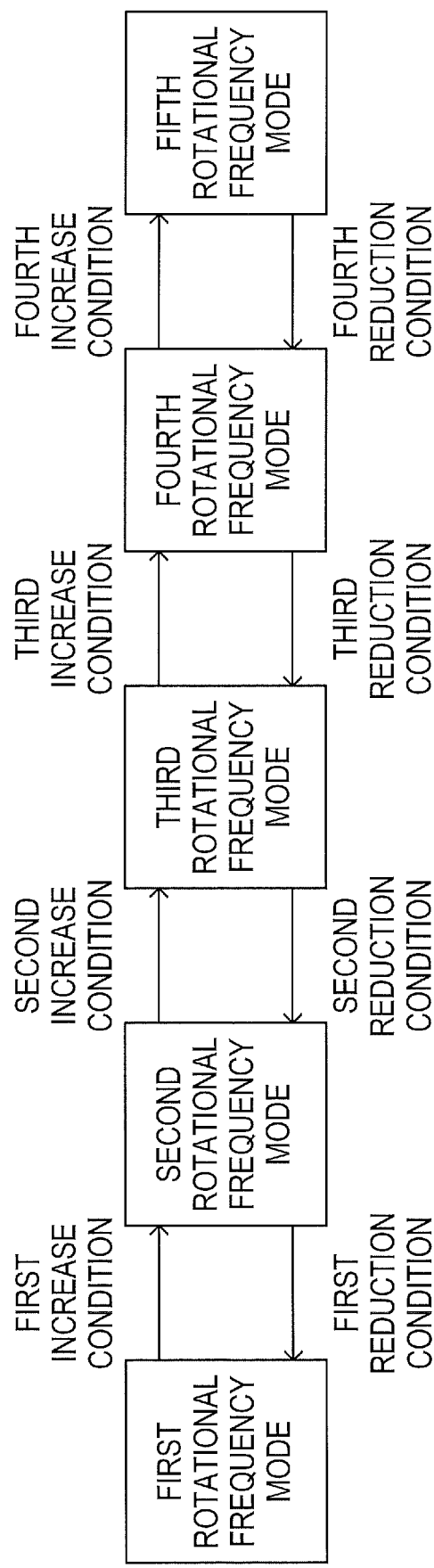
FIG. 3 is a diagram illustrating how speed modes are changed in an automatic speed shifting mode for a metal blade.

As shown in FIG. 3, the first increase condition is a condition for changing the speed mode from the first rotational frequency mode to the second rotational frequency mode. The first increase condition includes a first increase current threshold THu1, a first increase confirmation time Tu1, and a first mask (or disabling) time Tm1.

Specifically, the first increase condition is fulfilled if a state in which the load current value Im is equal to or larger than the first increase current threshold THu1 continues for the first increase confirmation time Tu1 or longer. If the speed mode is set to the first rotational frequency mode and the first increase condition is fulfilled, the speed mode is automatically changed from the first rotational frequency mode to the second rotational frequency mode.

Immediately after the motor 20 is started, an excessively large inrush current transiently flows through the motor 20. If it is determined based on the inrush current whether the first increase condition is fulfilled, it may be erroneously determined that a large load is imposed on the motor 20 although the load actually imposed on the motor 20 is small, and thereby erroneously determined that the first increase condition is fulfilled. Accordingly, the first increase condition includes the first mask time Tm1 as described above. After the motor 20 is started, the control circuit 36 does not determine whether the first increase condition is fulfilled based on the load current value Im until the first mask time Tm1 passes.

The second increase condition is a condition for changing the speed mode from the second rotational frequency mode to the third rotational frequency mode. The second increase condition includes a second increase current threshold THu2, a second increase confirmation time Tu2, and a second mask time Tm2. The second increase current threshold THu2 is larger than the first increase current threshold THu1.

Specifically, the second increase condition is fulfilled if a state in which the load current value Im is equal to or larger than the second increase current threshold THu2 continues for the second increase confirmation time Tu2 or longer. If the speed mode is set to the second rotational frequency mode and the second increase condition is fulfilled, the speed mode is automatically changed from the second rotational frequency mode to the third rotational frequency mode.

An excessively large inrush current transiently flows through the motor 20 immediately after an increase in a target rotational frequency of the motor 20 similarly to when the motor 20 is started. Accordingly, the second increase condition includes the second mask time Tm2 as described above. That is, after the speed mode is changed from the first rotational frequency mode to the second rotational frequency mode, the control circuit 36 does not determine whether the second increase condition is fulfilled based on the load current value Im until the second mask time Tm2 passes.

The third increase condition is a condition for changing the speed mode from the third rotational frequency mode to the fourth rotational frequency mode. The third increase condition includes a third increase current threshold THu3, a third increase confirmation time Tu3, and a third mask time Tm3. The third increase current threshold THu3 is larger than the second increase current threshold THu2.

Specifically, the third increase condition is fulfilled if a state in which the load current value Im is equal to or larger than the third increase current threshold THu3 continues for the third increase confirmation time Tu3 or longer. If the speed mode is set to the third rotational frequency mode and the third increase condition is fulfilled, the speed mode is automatically changed from the third rotational frequency mode to the fourth rotational frequency mode.

The third increase condition includes the third mask time Tm3 as described above. That is, after the speed mode is changed from the second rotational frequency mode to the third rotational frequency mode, the control circuit 36 does not determine whether the third increase condition is fulfilled based on the load current value Im until the third mask time Tm3 passes.

The fourth increase condition is a condition for changing the speed mode from the fourth rotational frequency mode to the fifth rotational frequency mode. The fourth increase condition includes a fourth increase current threshold THu4, a fourth increase confirmation time Tu4, and a fourth mask time Tm4. The fourth increase current threshold THu4 is larger than the third increase current threshold THu3.

Specifically, the fourth increase condition is fulfilled if a state in which the load current value Im is equal to or larger than the fourth increase current threshold THu4 continues for the fourth increase confirmation time Tu4 or longer. If the speed mode is set to the fourth rotational frequency mode and the fourth increase condition is fulfilled, the speed mode is automatically changed from the fourth rotational frequency mode to the fifth rotational frequency mode.

The fourth increase condition includes the fourth mask time Tm4 as described above. That is, after the speed mode is changed from the third rotational frequency mode to the fourth rotational frequency mode, the control circuit 36 does not determine whether the fourth increase condition is fulfilled based on the load current value Im until the fourth mask time Tm4 passes.

The fourth reduction condition is a condition for changing the speed mode from the fifth rotational frequency mode to the fourth rotational frequency mode. The fourth reduction condition includes a fourth reduction current threshold THd4 and a fourth reduction confirmation time Td4. The fourth reduction current threshold THd4 is smaller than the fourth increase current threshold THu4. The fourth reduction confirmation time Td4 is longer than the fourth increase confirmation time Tu4.

Specifically, the fourth reduction condition is fulfilled if a state in which the load current value Im is equal to or smaller than the fourth reduction current threshold THd4 continues for the fourth reduction confirmation time Td4 or longer. If the speed mode is set to the fifth rotational frequency mode and the fourth reduction condition is fulfilled, the speed mode is automatically changed from the fifth rotational frequency mode to the fourth rotational frequency mode.

The third reduction condition is a condition for changing the speed mode from the fourth rotational frequency mode to the third rotational frequency mode. The third reduction condition includes a third reduction current threshold THd3 and a third reduction confirmation time Td3. The third reduction current threshold THd3 is smaller than the third increase current threshold THu3. The third reduction confirmation time Td3 is longer than the third increase confirmation time Tu3.

Specifically, the third reduction condition is fulfilled if a state in which the load current value Im is equal to or smaller than the third reduction current threshold THd3 continues for the third reduction confirmation time Td3 or longer. If the speed mode is set to the fourth rotational frequency mode and the third reduction condition is fulfilled, the speed mode is automatically changed from the fourth rotational frequency mode to the third rotational frequency mode.

The second reduction condition is a condition for changing the speed mode from the third rotational frequency mode to the second rotational frequency mode. The second reduction condition includes a second reduction current threshold THd2 and a second reduction confirmation time Td2. The second reduction current threshold THd2 is smaller than the second increase current threshold THu2. The second reduction confirmation time Td2 is longer than the second increase confirmation time Tu2.

Specifically, the second reduction condition is fulfilled if a state in which the load current value Im is equal to or smaller than the second reduction current threshold THd2 continues for the second reduction confirmation time Td2 or longer. If the speed mode is set to the third rotational frequency mode and the second reduction condition is fulfilled, the speed mode is automatically change from the third rotational frequency mode to the second rotational frequency mode.

The first reduction condition is a condition for changing the speed mode from the second rotational frequency mode to the first rotational frequency mode. The first reduction condition includes a first reduction current threshold THd1 and a first reduction confirmation time Td1. The first reduction current threshold THd1 is smaller than the first increase current threshold THu1. The first reduction confirmation time Td1 is longer than the first increase confirmation time Tu1.

Specifically, the first reduction condition is fulfilled if a state in which the load current value Im is equal to or smaller than the first reduction current threshold THd1 continues for the first reduction confirmation time Td1 or longer. If the speed mode is set to the second rotational frequency mode and the first reduction condition is fulfilled, the speed mode is automatically changed from the second rotational frequency mode to the first rotational frequency mode.

In the present embodiment, a sixth increase condition, a seventh increase condition, a sixth reduction condition, and a seventh reduction condition are specified as conditions for change on which the speed mode is automatically changed in a case where the nylon cord cutter 4b is attached to the driver 3.

Figure 4:
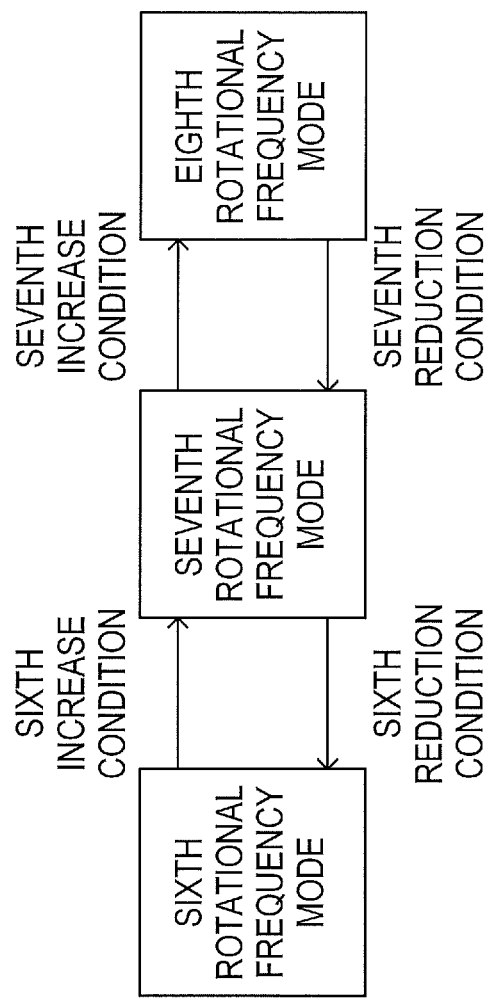
FIG. 4 is a diagram illustrating how speed modes are changed in an automatic speed shifting mode for a nylon cord cutter.

As shown in FIG. 4, the sixth increase condition is a condition for changing the speed mode from the sixth rotational frequency mode to the seventh rotational frequency mode. The sixth increase condition includes a sixth increase current threshold THu6, a sixth increase confirmation time Tu6, and a mask time Tm6.

Specifically, the sixth increase condition is fulfilled if a state in which the load current value Im is equal to or larger than the sixth increase current threshold THu6 continues for the sixth increase confirmation time Tu6 or longer. If the speed mode is set to the sixth rotational frequency mode and the sixth increase condition is fulfilled, the speed mode is automatically changed from the sixth rotational frequency mode to the seventh rotational frequency mode. After the motor 20 is started, the control circuit 36 does not determine whether the sixth increase condition is fulfilled based on the load current value Im until the mask time Tm6 passes. The sixth increase current threshold THu6 is larger than the first increase current threshold THu1.

The seventh increase condition is a condition for changing the speed mode from the seventh rotational frequency mode to the eighth rotational frequency mode. The seventh increase condition includes a seventh increase current threshold THu7, a seventh increase confirmation time Tu7, and a mask time Tm7. The seventh increase current threshold THu7 is larger than the sixth increase current threshold THu6.

Specifically, the seventh increase condition is fulfilled if a state in which the load current value Im is equal to or larger than the seventh increase current threshold THu7 continues for the seventh increase confirmation time Tu7 or longer. If the speed mode is set to the seventh rotational frequency mode and the seventh increase condition is fulfilled, the speed mode is automatically changed from the seventh rotational frequency mode to the eighth rotational frequency mode.

After the speed mode is changed from the sixth rotational frequency mode to the seventh rotational frequency mode, the control circuit 36 does not determined whether the seventh increase condition is fulfilled based on the load current value Im until the mask time Tm7 passes.

The seventh reduction condition is a condition for changing the speed mode from the eighth rotational frequency mode to the seventh rotational frequency mode. The seventh reduction condition includes a seventh reduction current threshold THd7 and a seventh reduction confirmation time Td7. The seventh reduction current threshold THd7 is smaller than the seventh increase current threshold THu7. The seventh reduction confirmation time Td7 is longer than the seventh increase confirmation time Tu7.

Specifically, the seventh reduction condition is fulfilled if a state in which the load current value Im is equal to or smaller than the seventh reduction current threshold THd7 continues for the seventh reduction confirmation time Td7 or longer. If the speed mode is set to the eighth rotational frequency mode and the seventh reduction condition is fulfilled, the speed mode is automatically changed from the eighth rotational frequency mode to the seventh rotational frequency mode.

The sixth reduction condition is a condition for changing the speed mode from the seventh rotational frequency mode to the sixth rotational frequency mode. The sixth reduction condition includes a sixth reduction current threshold THd6 and a sixth reduction confirmation time Td6. The sixth reduction current threshold THd6 is smaller than the sixth increase current threshold THu6. The sixth reduction confirmation time Td6 is longer than the sixth increase confirmation time Tu6.

Specifically, the sixth reduction condition is fulfilled if a state in which the load current value Im is equal to or smaller than the sixth reduction current threshold THd6 continues for the sixth reduction confirmation time Td6 or longer. If the speed mode is set to the seventh rotational frequency mode and the sixth reduction condition is fulfilled, the speed mode is automatically changed from the seventh rotational frequency mode to the sixth rotational frequency mode.

The first to the fourth increase confirmation times Tu1 to Tu4 are each longer than both of the sixth and the seventh increase confirmation times Tu6, Tu7. Moreover, the first to the fourth mask times Tm1 to Tm4 are each longer than both of the sixth and the seventh mask times Tm6, Tm7.

The following describes the procedure of the grass cutter control process performed by the control circuit 36. The grass cutter control process is repeated every time a specified control cycle (for example, 1 ms) passes.

Figure 5:
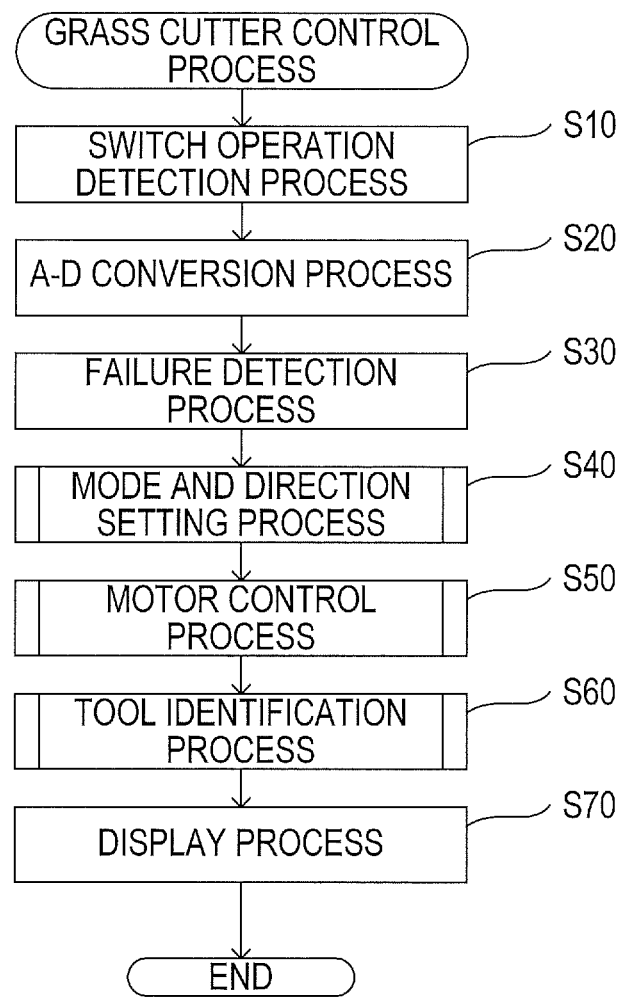
FIG. 5 is a flowchart illustrating a grass cutter control process.

As shown in FIG. 5, upon the initiation of the grass cutter control process, the control circuit 36 first performs a switch operation detection process in S10. In the switch operation detection process, the control circuit 36 detects whether the trigger switch 12, the main power switch 14, the mode change switch 15, and the reverse rotation switch 16 are ON.

In S20, the control circuit 36 performs an analog-digital (A-D) conversion process. In the A-D conversion process, the control circuit 36 converts the battery voltage detection signal from the battery voltage detector 42 and the current detection signal from the current detection circuit 44 into digital values and stores the digital values in the RAM 36c. The digital value of the current detection signal (that is, a digital value of the load current value Im) will be hereinafter referred to as a motor current value Imt.

In S30, the control circuit 36 performs a failure detection process. In the failure detection process, the control circuit 36 detects failure, such as an overcurrent and reduction of the battery voltage, based on the digital values obtained in S20.

In S40, the control circuit 36 performs a mode and direction setting process, the detail of which will be described later.

In S50, the control circuit 36 performs a motor control process, the detail of which will be described later.

In S60, the control circuit 36 performs a tool identification process, the detail of which will be described later.

In S70, the control circuit 36 performs a display process, and then temporarily finishes the grass cutter control process. In the display process, the control circuit 36 indicates, for example, the operation state of the motor 20, the remaining power of the battery 18, and failure of the grass cutter 1 on the display 11.

The following describes the procedure of the above-described mode and direction setting process performed in S40.

Figure 6:
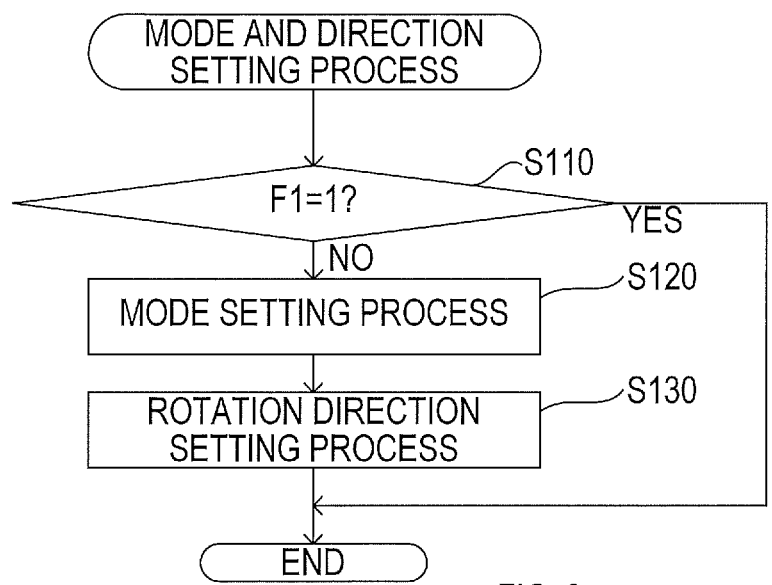
FIG. 6 is a flowchart illustrating a mode and direction setting process.

As shown in FIG. 6, upon the initiation of the mode and direction setting process, the control circuit 36 first determines in S110 whether a tool identification in-process flag F1 stored in the RAM 36c is set. In the description below, setting a flag corresponds to setting the value of the flag to 1, and clearing the flag corresponds to setting the value of the flag to zero.

At this time, if the tool identification in-process flag F1 is set, the control circuit 36 finishes the mode and direction setting process. On the other hand, if the tool identification in-process flag F1 is cleared, the control circuit 36 performs a mode setting process in S120.

In the mode setting process, the control circuit 36 sets the operation mode to the constant rotation mode or the automatic speed shifting mode based on the detection result of the mode change switch 15 in the switch operation detection process. In the mode setting process, the control circuit 36 sets the speed mode to one of the high speed mode, the medium speed mode, and the low speed mode based on the detection result of the main power switch 14 in the switch operation detection process. Specifically, in a case where the operation mode is set to the constant rotation mode, every time the main power switch 14 is short pressed, the control circuit 36 cyclically changes the speed mode to the subsequent mode in the order of the high speed mode, the medium speed mode, and the low speed mode.

In S130, the control circuit 36 performs a rotation direction setting process, and subsequently finishes the mode and direction setting process. In the rotation direction setting process, the control circuit 36 alternately changes the rotation direction of the motor 20 to the forward direction or to the reverse direction based on the detection result of the reverse rotation switch 16 in the switch operation detection process. Specifically, the rotation direction of the motor 20 is alternately changed to the forward direction or the reverse direction every time the reverse rotation switch 16 is turned on.

The following describes the procedure of the aforementioned motor control process performed in S50.

Figure 7:
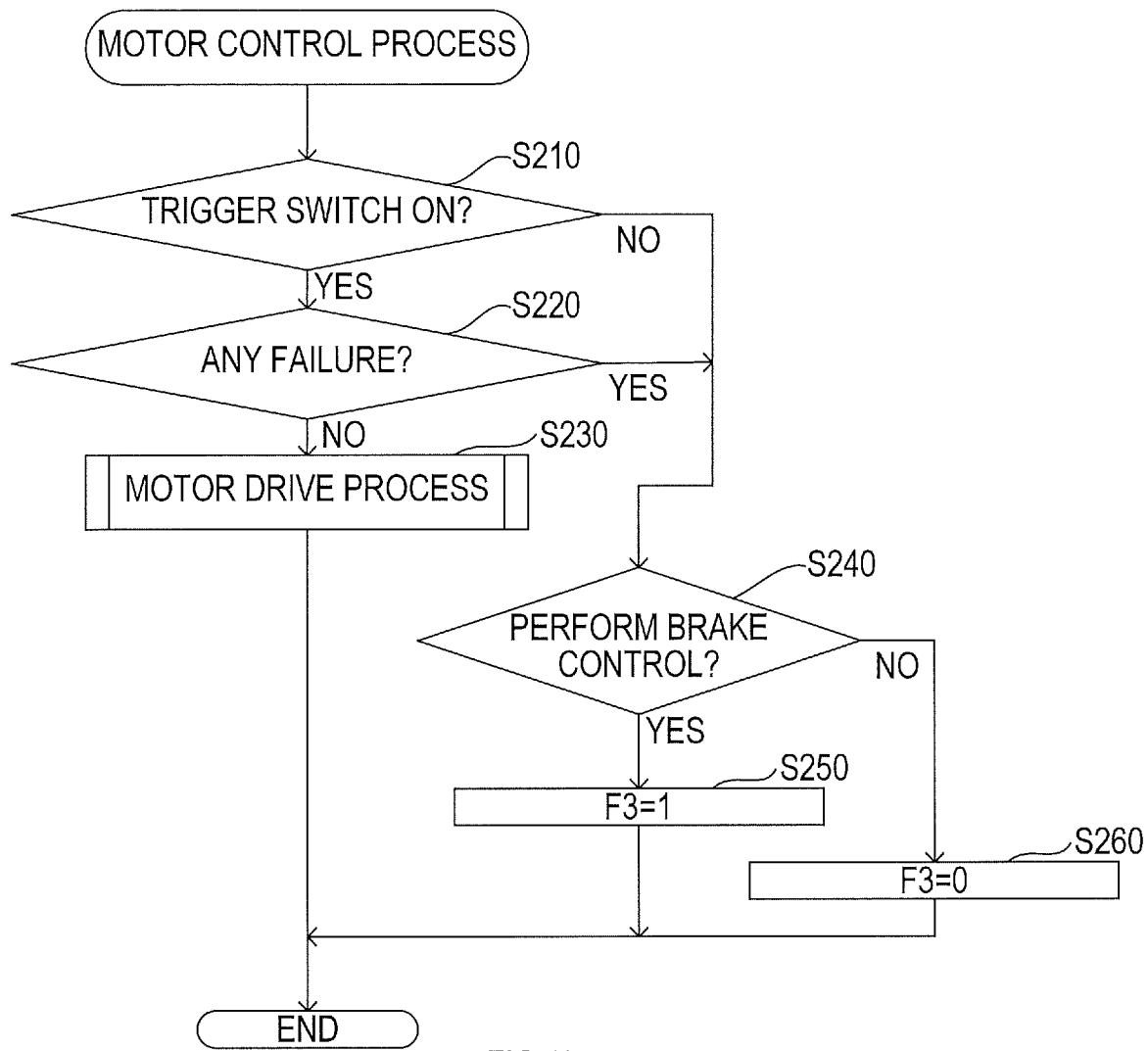
FIG. 7 is a flowchart illustrating a motor control process.

As shown in FIG. 7, upon the initiation of the motor control process, the control circuit 36 first determines in S210 whether the trigger switch 12 is ON. At this time, if the trigger switch 12 is not ON, the control circuit 36 proceeds to S240.

If the trigger switch 12 is ON, the control circuit 36 determines in S220 whether any failure has been detected in the aforementioned failure detection process in S30. At this time, if no failure has been detected, the control circuit 36 performs a motor drive process in S230, and then finishes the motor control process. The detail of the motor drive process will be described later. On the other hand, if a failure has been detected, the control circuit 36 proceeds to S240.

In S240, the control circuit 36 determines whether to perform a brake control. Specifically, the control circuit 36 determines to perform the brake control if (i) the motor 20 is rotating and (ii) generating a braking force for the motor 20 does not affect the controller 9 (for example, a counter electromotive force generated in the motor 20 does not affect the controller 9). If determining to perform the brake control, the control circuit 36 sets in S250 a brake flag F3 stored in the RAM 36c, and then finishes the motor control process. In response to the brake flag F3 being set, the control circuit 36 turns on or off the first to the sixth switching elements Q1 to Q6 individually in accordance with a specified procedure so as to cause short-circuit braking and generates the braking force for the motor 20.

If determining not to perform the brake control, the control circuit 36 clears the brake flag F3 in S260, and then finishes the motor control process.

The following describes the procedure of the aforementioned motor drive process performed in S230.

Figure 8:
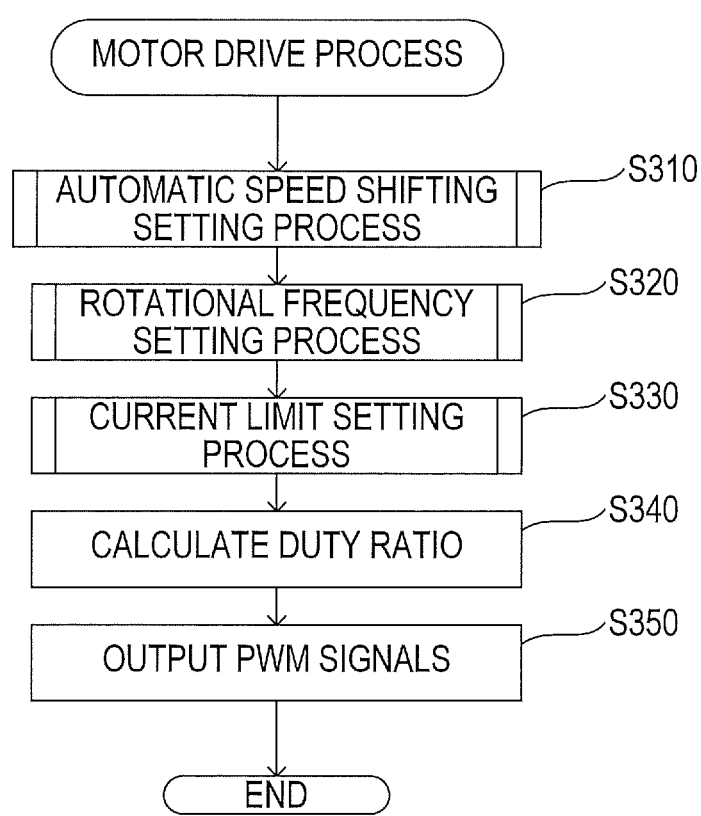
FIG. 8 is a flowchart illustrating a motor drive process.

As shown in FIG. 8, upon the initiation of the motor drive process, the control circuit 36 first performs in S310 an automatic speed shifting setting process, the detail of which will be described later.

In S320, the control circuit 36 performs a rotational frequency setting process, the detail of which will be described later.

In S330, the control circuit 36 performs a current limit setting process, the detail of which will be described later.

In S340, the control circuit 36 calculates a duty ratio of each of the aforementioned PWM signals based on a feedback control so that the deviation between the actual rotational frequency and the target rotational frequency of the motor 20 becomes zero.

In S350, the control circuit 36 outputs control signals that include the PWM signals each having the duty ratio calculated in S340 to the gate circuit 34, and then finishes the motor drive process.

The following describes the procedure of the aforementioned automatic speed shifting setting process performed in S310.

Figure 9:
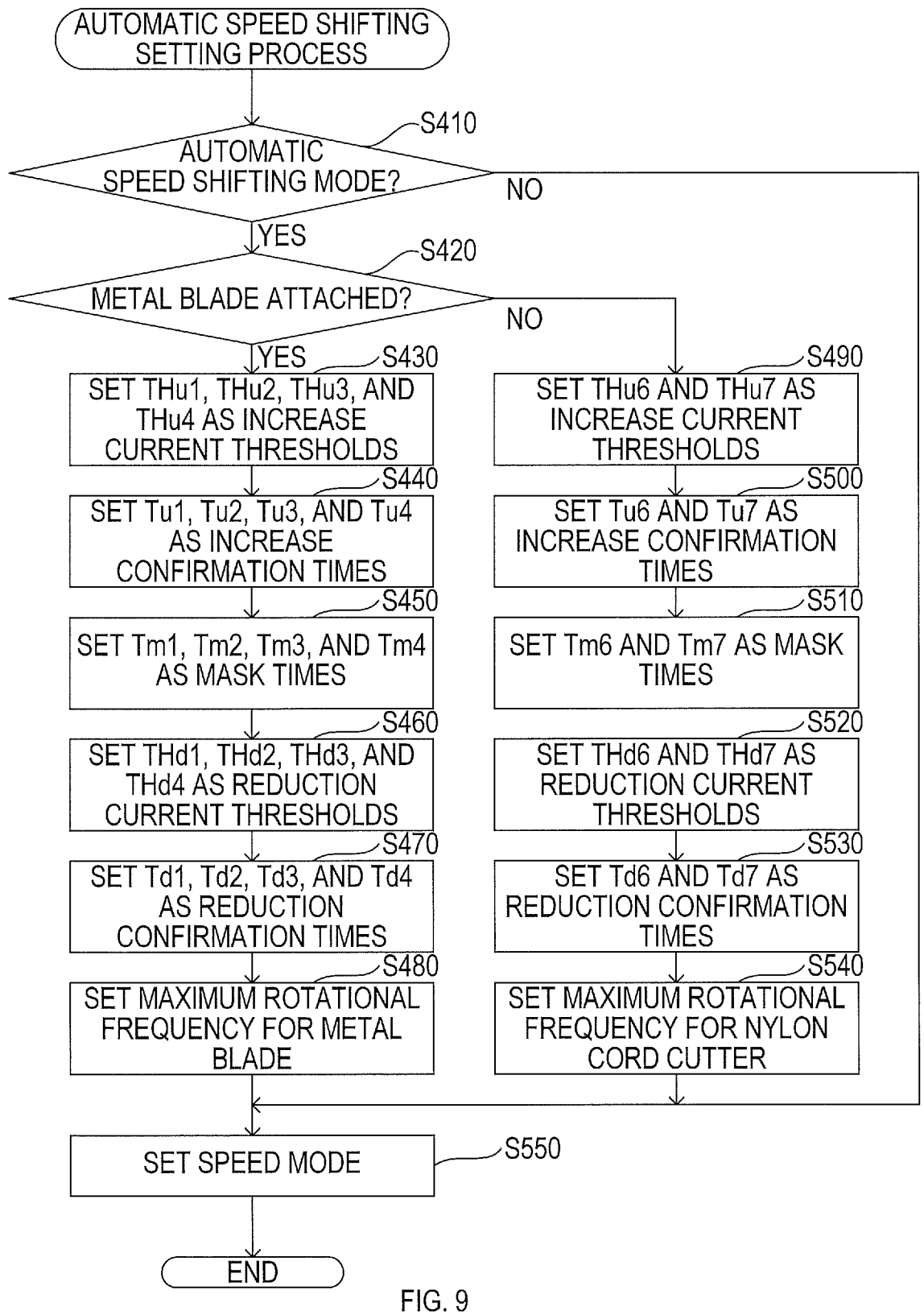
FIG. 9 is a flowchart illustrating an automatic speed shifting setting process.

As shown in FIG. 9, upon the initiation of the automatic speed shifting setting process, the control circuit 36 first determines in S410 whether the operation mode is set to the automatic speed shifting mode. At this time, if the operation mode is not set to the automatic speed shifting mode, the control circuit 36 finishes the automatic speed shifting setting process.

If the operation mode is set to the automatic speed shifting mode, the control circuit 36 determines in S420 whether the metal blade 4a is attached to the driver 3. Specifically, the control circuit 36 determines that the metal blade 4a is attached to the driver 3, if a tool identification result RJ stored in the RAM 36c is set to a value of "1".

At this time, if the metal blade 4a is attached to the driver 3, in S430, the control circuit 36 sets the increase current thresholds for the metal blade 4a. Specifically, the control circuit 36 sets the first increase current threshold THu1, the second increase current threshold THu2, the third increase current threshold THu3, and the fourth increase current threshold THu4 as the increase current thresholds for the metal blade 4a.

In S440, the control circuit 36 sets the increase confirmation times for the metal blade 4a. Specifically, the control circuit 36 sets the first increase confirmation time Tu1, the second increase confirmation time Tu2, the third increase confirmation time Tu3, and the fourth increase confirmation time Tu4 as the increase confirmation times for the metal blade 4a.

In S450, the control circuit 36 sets the mask times for the metal blade 4a. Specifically, the control circuit 36 sets the first mask time Tm1, the second mask time Tm2, the third mask time Tm3, and the fourth mask time Tm4 as the mask times for the metal blade 4a.

In S460, the control circuit 36 sets the reduction current thresholds for the metal blade 4a. Specifically, the control circuit 36 sets the first reduction current threshold THd1, the second reduction current threshold THd2, the third reduction current threshold THd3, and the fourth reduction current threshold THd4 as the reduction current thresholds for the metal blade 4a.

In S470, the control circuit 36 sets the reduction confirmation times for the metal blade 4a. Specifically, the control circuit 36 sets the first reduction confirmation time Td1, the second reduction confirmation time Td2, the third reduction confirmation time Td3, and the fourth reduction confirmation time Td4 as the reduction confirmation times for the metal blade 4a.

In S480, the control circuit 36 sets the maximum rotational frequency for the metal blade 4a and then proceeds to S550. Specifically, the control circuit 36 sets a specified maximum rotational frequency (for example, 7500 rpm) for the metal blade 4a.

In S420, if the metal blade 4a is not attached to the driver 3, the control circuit 36 sets in S490 the increase current thresholds for the nylon cord cutter 4b. Specifically, the control circuit 36 sets the sixth increase current threshold THu6 and the seventh increase current threshold THu7 as the increase current thresholds for the nylon cord cutter 4b.

In S500, the control circuit 36 sets the increase confirmation times for the nylon cord cutter 4b. Specifically, the control circuit 36 sets the sixth increase confirmation time Tu6 and the seventh increase confirmation time Tu7 as the increase confirmation times for the nylon cord cutter 4b.

In S510, the control circuit 36 sets the mask times for the nylon cord cutter 4b. Specifically, the control circuit 36 sets the sixth mask time Tm6 and the seventh mask time Tm7 as the mask times for the nylon cord cutter 4b.

In S520, the control circuit 36 sets the reduction current thresholds for the nylon cord cutter 4b. Specifically, the control circuit 36 sets the sixth reduction current threshold THd6 and the seventh reduction current threshold THd7 as the reduction current thresholds for the nylon cord cutter 4b.

In S530, the control circuit 36 sets the reduction confirmation times for the nylon cord cutter 4b. Specifically, the control circuit 36 sets the sixth reduction confirmation time Td6 and the seventh reduction confirmation time Td7 as the reduction confirmation times for the nylon cord cutter 4b.

In S540, the control circuit 36 sets the maximum rotational frequency for the nylon cord cutter 4b, and then proceeds to S550. Specifically, the control circuit 36 sets a specified maximum rotational frequency for the nylon cord cutter 4b (for example, 5500 rpm).

Proceeding to S550, the control circuit 36 sets the speed mode in the automatic speed shifting mode based on the increase current thresholds, the increase confirmation times, the mask times, the reduction current thresholds, the reduction confirmation times set as described above, and then finishes the automatic speed shifting setting process.

The following describes the procedure of the aforementioned rotational frequency setting process performed in S320.

Figure 10:
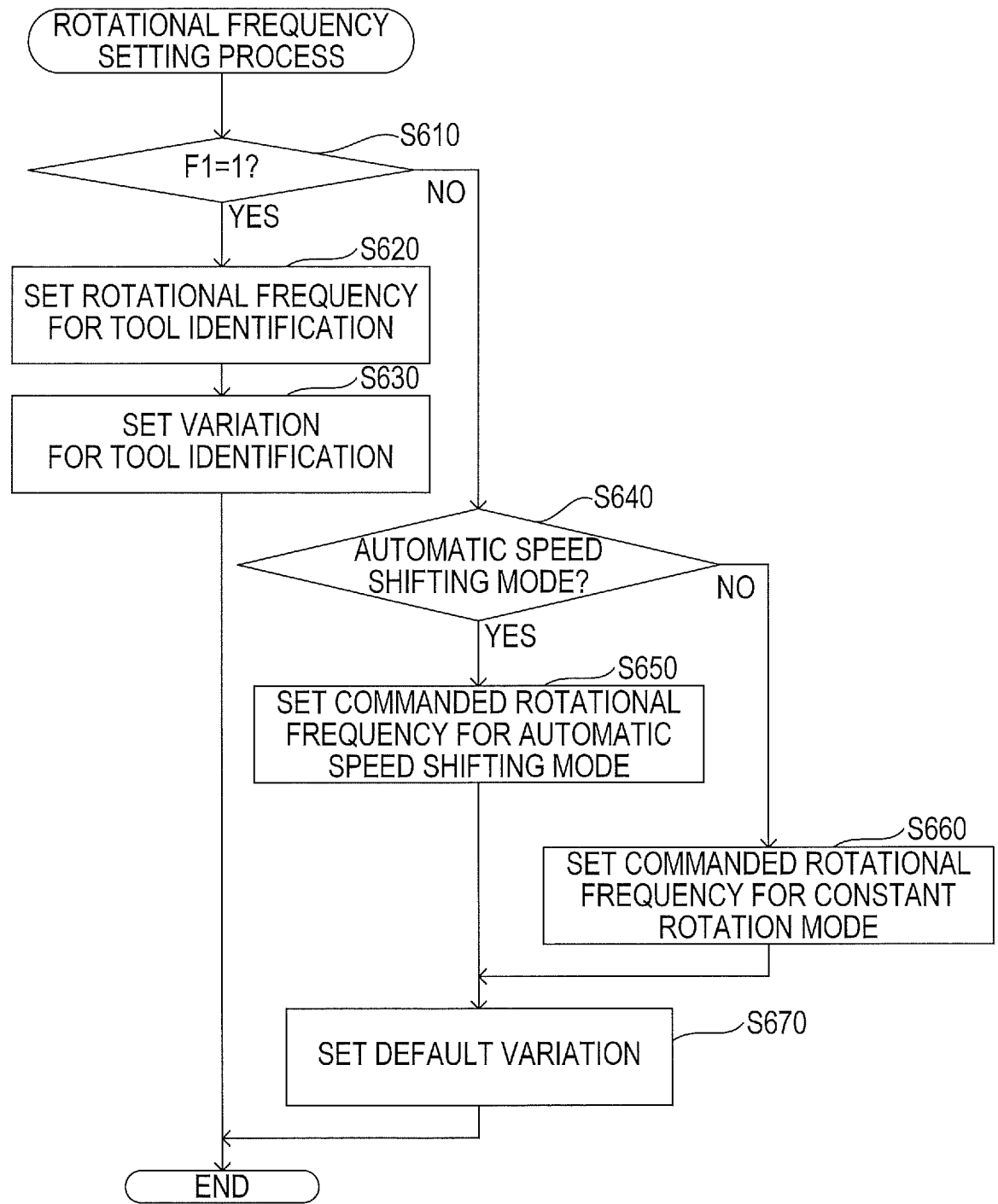
FIG. 10 is a flowchart illustrating a rotational frequency setting process.

As shown in FIG. 10, upon the initiation of the rotational frequency setting process, the control circuit 36 first determines in S610 whether the tool identification in-process flag F1 is set. At this time, if the tool identification in-process flag F1 is set, the control circuit 36 sets the commanded rotational frequency to identify the tool 4 in S620. Specifically, the control circuit 36 sets the commanded rotational frequency to a specified rotational frequency for identifying the tool 4 (i.e. rotational frequency for tool identification).

In S630, the control circuit 36 sets a variation per unit time t0 identify the tool 4, and then finishes the rotational frequency setting process. Specifically, the control circuit 36 sets the variation per unit time t0 a specified variation for identifying the tool 4 (i.e. variation for tool identification). Accordingly, the control circuit 36 increases the target rotational frequency by the variation for tool identification in response to the elapse of every execution cycle described above until the target rotational frequency reaches the rotational frequency for tool identification.

In S610, if the tool identification in-process flag F1 is cleared, the control circuit 36 determines in S640 whether the operation mode is set to the automatic speed shifting mode. At this time, if the operation mode is set to the automatic speed shifting mode, the control circuit 36 sets a default commanded rotational frequency for the automatic speed shifting mode in S650, and then proceed to S670. Specifically, the control circuit 36 sets the commanded rotational frequency to a rotational frequency, specified for the automatic speed shifting mode, based on the speed mode set in S550. For example, if the speed mode is set to the third rotational frequency mode, the control circuit 36 sets the commanded rotational frequency to 5500 rpm.

If the operation mode is not set to the automatic speed shifting mode, the control circuit 36 sets a default commanded rotational frequency for the constant rotation mode in S660, and then proceeds to S670. Specifically, the control circuit 36 sets the commanded rotational frequency to a rotational frequency, specified for the constant rotation mode, based on the speed mode set in the aforementioned mode setting process in S120 and based on the type of the identified tool 4. For example, if the identified tool 4 is the nylon cord cutter 4b and the speed mode is set to the medium speed mode, the control circuit 36 sets the commanded rotational frequency to 4500 rpm.

Proceeding to S670, the control circuit 36 sets the variation per unit time to a default (or normal) variation, and then finishes the rotational frequency setting process. Accordingly, the control circuit 36 increases the target rotational frequency by the variation per unit time in response to the elapse of every execution cycle described above until the target rotational frequency reaches the commanded rotational frequency set in S650 or S660. The aforementioned variation for tool identification is larger than the default variation.

The following describes the procedure of the current limit setting process performed in S330.

Figure 11:
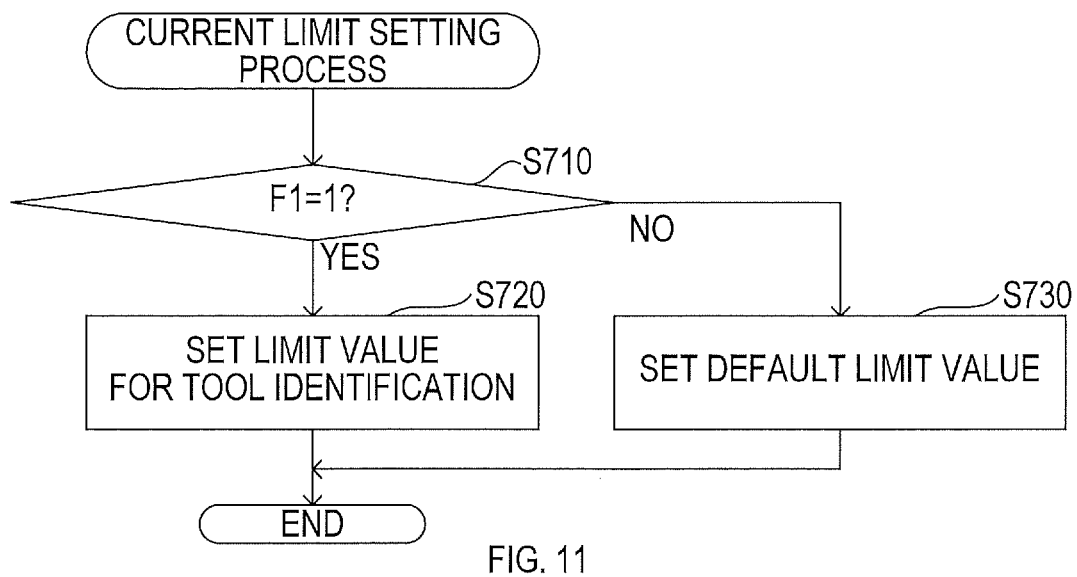
FIG. 11 is a flowchart illustrating a current limit setting process.

As shown in FIG. 11, upon the initiation of the current limit setting process, the control circuit 36 first determines in S710 whether the tool identification in-process flag F1 is set. At this time, if the tool identification in-process flag F1 is set, the control circuit 36 sets a current limit value for identifying the tool 4 in S720, and then finishes the current limit setting process. Specifically, the control circuit 36 sets the current limit value to a specified limit value for tool identification.

On the other hand, if the tool identification in-process flag F1 is cleared, the control circuit 36 sets in S730 the current limit value to a default limit value, and then finishes the current limit setting process.

The following describes the procedure of the tool identification process performed in S60.

Figure 12:
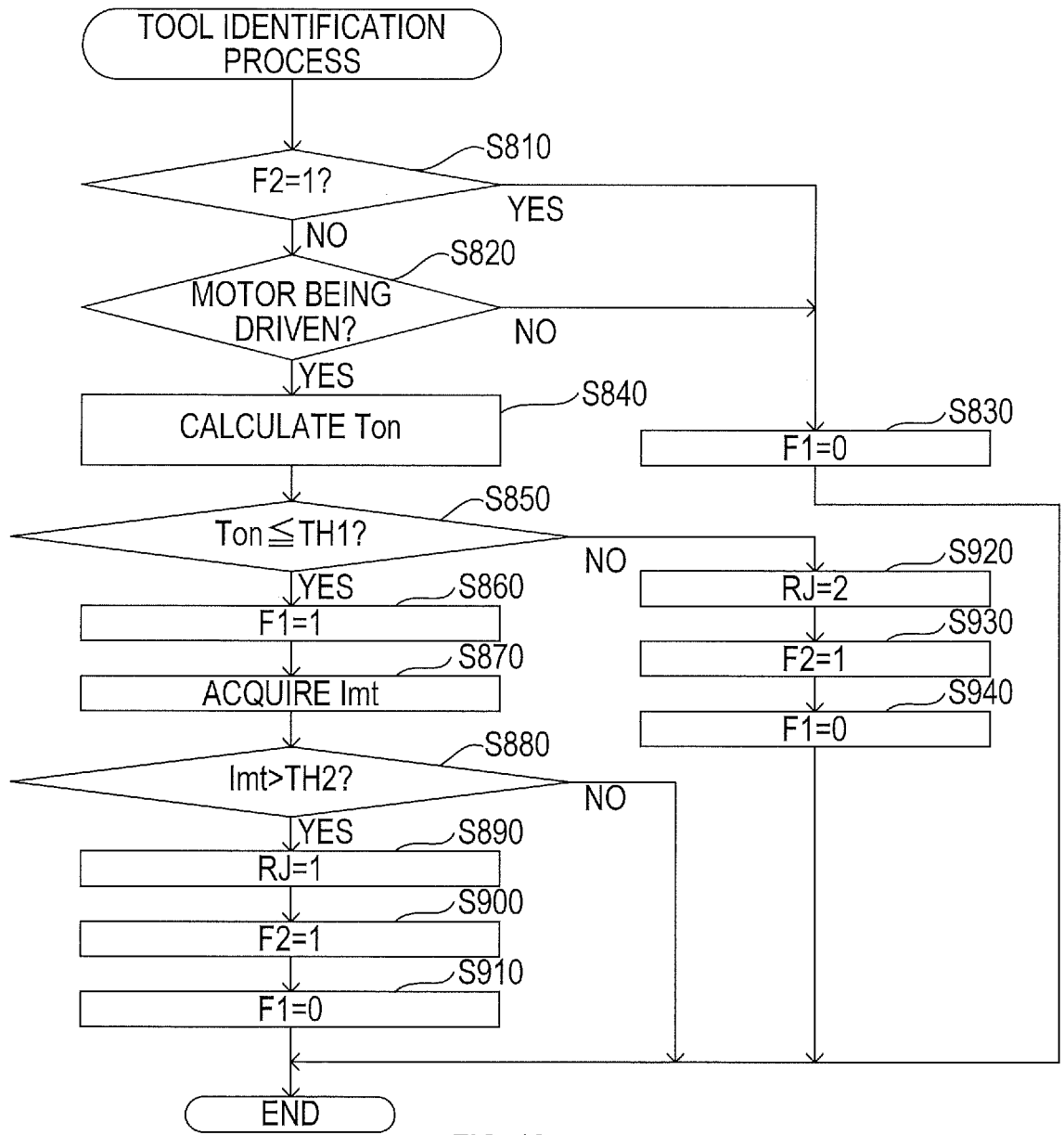
FIG. 12 is a flowchart illustrating a tool identification process.

As shown in FIG. 12, upon the initiation of the tool identification process, the control circuit 36 first determines in S810 whether a tool identification complete flag F2 stored in the RAM 36c is set. At this time, if the tool identification complete flag F2 is set, the control circuit 36 proceeds to S830. On the other hand, if the tool identification complete flag F2 is cleared, the control circuit 36 determines in S820 whether the motor 20 is being driven. At this time, if the motor 20 is not being driven, the control circuit 36 proceeds to S830.

In S830, the control circuit 36 clears the tool identification in-process flag F1, and then finishes the tool identification process.

In S820, if the motor 20 is being driven, the control circuit 36 calculates an ON-time Ton in S840, and stores the calculated ON-time Ton in the RAM 36c. The ON-time Ton corresponds to the time elapsed since the start of driving of the motor 20.

In S850, the control circuit 36 determines whether the ON-time Ton is equal to or smaller than a specified duration determination threshold TH1. At this time, if the ON-time Ton is equal to or smaller than the duration determination threshold TH1, the control circuit 36 sets the tool identification in-process flag F1 in S860.

In S870, the control circuit 36 acquires the motor current value Imt stored in the RAM 36c.

In S880, the control circuit 36 determines whether the motor current value Imt exceeds a specified metal blade determination threshold TH2. At this time, if the motor current value Imt is equal to or smaller than the metal blade determination threshold TH2, the control circuit 36 finishes the tool identification process.

On the other hand, if the motor current value Imt exceeds the metal blade determination threshold TH2, the control circuit 36 sets the tool identification result RJ to the value of "1" in S890. Accordingly, the control circuit 36 determines that the attached tool 4 is the metal blade 4a.

In S900, the control circuit 36 sets the tool identification complete flag F2. In S910, the control circuit 36 clears the tool identification in-process flag F1, and then finishes the tool identification process.

In S850, if the ON-time Ton exceeds the duration determination threshold TH1, the control circuit 36 sets the tool identification result RJ to the value of "2" in S920. Accordingly, the control circuit 36 determines that the attached tool 4 is the nylon cord cutter 4b.

In S930, the control circuit 36 sets the tool identification complete flag F2. In S940, the control circuit 36 clears the tool identification in-process flag F1, and then finishes the tool identification process.

The following describes an example of the procedure to identify the metal blade 4a.

Figure 13:
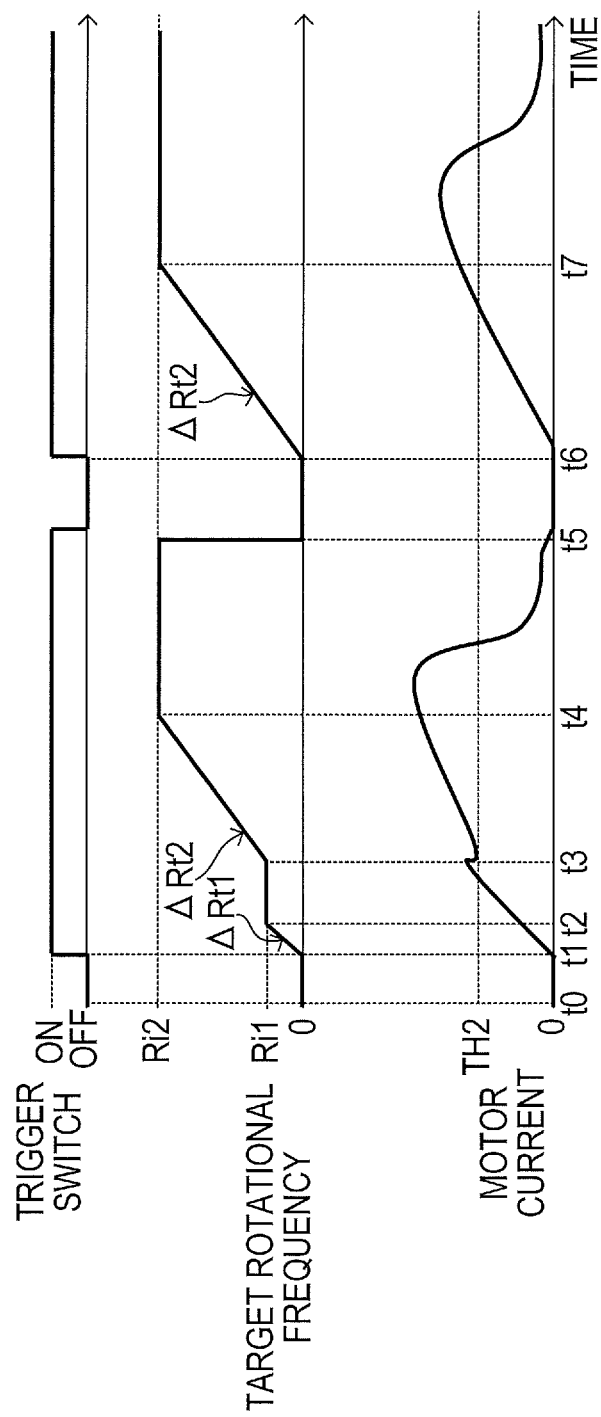
FIG. 13 is a timing diagram showing an example of a procedure for identifying the metal blade.

As shown in FIG. 13, at time t0, the trigger switch 12 is OFF (OFF-state), the target rotational frequency is zero, and the motor current value Imt is zero.

At time t1, the trigger switch 12 is turned on from the OFF-state. From time t1, the target rotational frequency is gradually increased by a variation for tool identification ΔRt1, and reaches a rotational frequency for tool identification Ri1 at time t2.

The motor current value Imt gradually increases with the target rotational frequency. At time t3, the motor current value Imt exceeds the metal blade determination threshold TH2. If the motor current value Imt exceeds the metal blade determination threshold TH2, the control circuit 36 determines that the metal blade 4a is attached to the driver 3.

Subsequently, the target rotational frequency is gradually increased by a default variation ΔRt2, and, at time t4, reaches a default commanded rotational frequency Ri2, which is set for the metal blade 4a. The motor current value Imt gradually increases with the target rotational frequency.

At time t5, the trigger switch 12 is turned off from the ON-state. Accordingly, the target rotational frequency is set to zero, and the motor current value Imt decreases to zero at time t5.

At time t6, the trigger switch 12 is turned on from the OFF-state. Accordingly, the target rotational frequency is gradually increased by the default variation ΔRt2, and reaches the default commanded rotational frequency Ri2 at time t7. The motor current value Imt gradually increases with the target rotational frequency.

The following describes an example of the procedure to identify the nylon cord cutter 4b.

Figure 14:
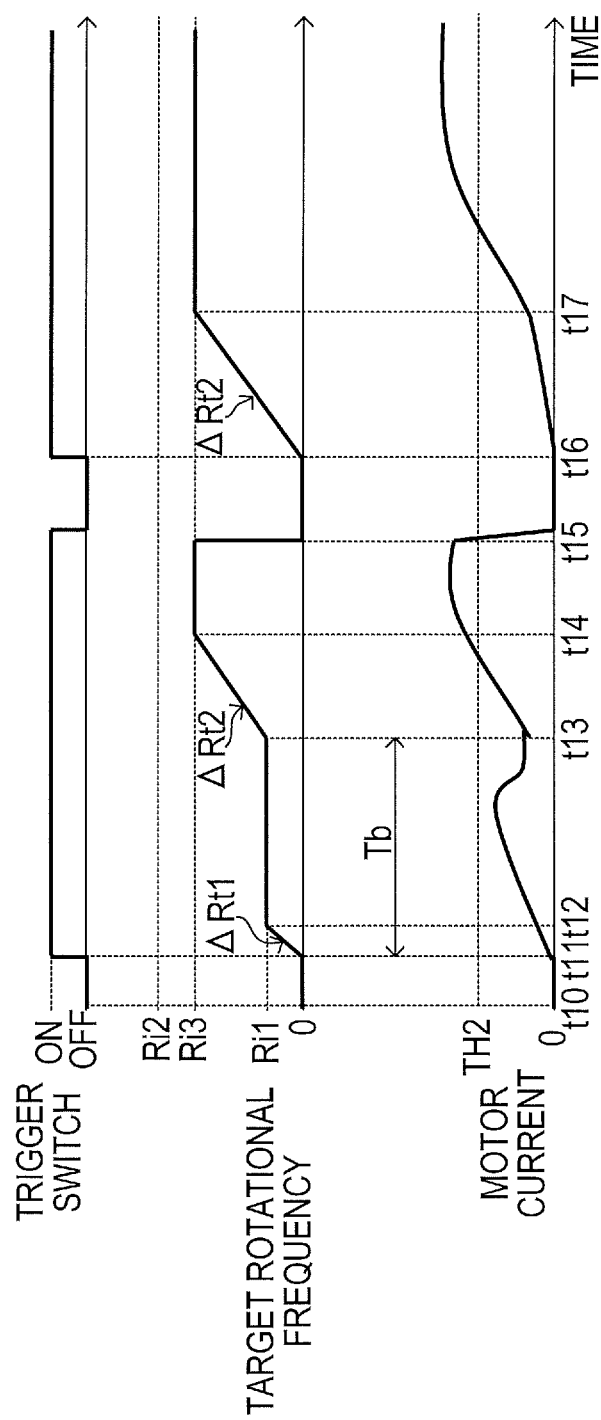
FIG. 14 is a timing diagram showing an example of a procedure for identifying the nylon cord cutter.

As shown in FIG. 14, at time t10, the trigger switch 12 is OFF, the target rotational frequency is zero, and the motor current value Imt is zero.

At time t11, the trigger switch 12 is turned on from the OFF-state. From time t11, the target rotational frequency is gradually increased by the variation for tool identification ΔRt1, and reaches the rotational frequency for tool identification Ri1 at time t12. The motor current value Imt gradually increases with the target rotational frequency.

At time t13, a tool identification time Tb elapses. The motor current value Imt does not exceed the metal blade determination threshold TH2 within the tool identification time Tb. Accordingly, the control circuit 36 determines that the nylon cord cutter 4b is attached to the driver 3.

Subsequently, the target rotational frequency is gradually increased by the default variation ΔRt2, and, at time t14, reaches a default commanded rotational frequency Ri3, which is set for the nylon cord cutter 4b. The motor current value Imt gradually increases with the target rotational frequency.

At time t15, the trigger switch 12 is turned off from the ON-state. Accordingly, the target rotational frequency is set to zero, and the motor current value Imt decreases to zero at time t15.

At time t16, the trigger switch 12 is turned on from the OFF-state. Accordingly, the target rotational frequency is gradually increased by the default variation ΔRt2, and reaches the default commanded rotational frequency Ri3 at time t17. The motor current value Imt gradually increases with the target rotational frequency.

The grass cutter 1 configured as described above includes the driver 3, the motor 20, and the controller 9. To the driver 3, the metal blade 4a and the nylon cord cutter 4b are selectively attached. The motor 20 drives the metal blade 4a or the nylon cord cutter 4b attached to the driver 3. The controller 9 controls the motor 20 to rotate at the target rotational frequency for the metal blade 4a or at the target rotational frequency for the nylon cord cutter 4b.

This configuration enables the grass cutter 1 to rotate the motor 20 at a rotational frequency suitable for the type of the tool 4 attached to the driver 3. Thus, the grass cutter 1 can inhibit an occurrence of a situation in which electric power is unnecessary consumed due to the nylon cord cutter 4b being driven at a target rotational frequency that is suitable for the metal blade 4a but too high for the nylon cord cutter 4b. Therefore, the grass cutter 1 can reduce unnecessary power consumption.

The controller 9 sets the maximum rotational frequency of the motor 20 based on the type of the tool 4. Accordingly, the grass cutter 1 can limit the rotational frequency of the motor 20 depending on the type of the tool 4 attached to the driver 3. That is, the grass cutter 1 can inhibit an occurrence of a situation in which the rotational frequency of the motor 20 becomes unnecessarily too high depending on the type of the tool 4, and thus further reduce unnecessary power consumption.

As the rotational frequency of the nylon cord cutter 4b increases, noise generated by the nylon cord cutter 4b becomes louder. In the grass cutter 1, the maximum rotational frequency for the nylon cord cutter 4b is lower than that for the metal blade 4a, thus reducing the noise generated by the rotating nylon cord cutter 4b. Noise generated by the metal blade 4a does not become as loud as that generated by the nylon cord cutter 4b, even when the rotational frequency of the metal blade 4a becomes high. Accordingly, the maximum rotational frequency for the metal blade 4a can be increased so as to improve the work efficiency of the grass cutter 1.

The controller 9 changes the target rotational frequency of the motor 20 in accordance with the load current value Im. The controller 9 determines that a load is imposed if a state in which the load current value Im is equal to or larger than the first increase current threshold THu1 continues for the first increase confirmation time Tu1 or longer. Having determined that a load is imposed on the motor 20, the controller 9 changes the speed mode from the first rotational frequency mode to the second rotational frequency mode and sets the target rotational frequency. The controller 9 determines that a load is imposed on the motor 20 if a state in which the load current value Im is equal to or larger than the sixth increase current threshold THu6 continues for the sixth increase confirmation time Tu6 or longer. Having determined that a load is imposed on the motor 20, the controller 9 changes the speed mode from the sixth rotational frequency mode to the seventh rotational frequency mode and sets the commanded rotational frequency. This configuration enables the grass cutter 1, while the load is imposed on the motor 20, to rotate the motor 20 at the rotational frequency suitable for the type of the tool 4 attached to the driver 3, and to reduce unnecessary power consumption.

The controller 9 determines the target rotational frequency, which is set prior to detection of the imposition of the load, to be the commanded rotational frequency for the first rotational frequency mode or the sixth rotational frequency mode depending on the type of the tool 4. This configuration enables the grass cutter 1, while the load is not imposed on the motor 20, to rotate the motor 20 at the rotational frequency suitable for the type of the tool 4 attached to the driver 3, and to reduce unnecessary power consumption.

The controller 9 sets the increase current thresholds, the increase confirmation times, the mask times, the reduction current thresholds, and the reduction confirmation times based on the type of the tool 4. This configuration enables the grass cutter 1 to suitably change the commanded rotational frequency depending on the type of the tool 4 attached to the driver 3, and to reduce unnecessary power consumption.

The first increase current threshold THu1 and the sixth increase current threshold THu6 are load imposed thresholds for determining the imposition of the load. The sixth increase current threshold THu6 is larger than the first increase current threshold THu1.

The target rotational frequency is changed in a stage-by-stage manner in accordance with the load imposed on the motor 20. The total number of stages to change the target rotational frequency varies from each type of the tool 4 attached to the driver 3. The total number of stages for the metal blade 4a is larger than the total number of stages for the nylon cord cutter 4b. That is, the target rotational frequency is changed (or switched) in five stages for the metal blade 4a, while the target rotational frequency is changed (or switched) in three stages for the nylon cord cutter 4b.

The controller 9 includes the automatic speed shifting mode and the constant rotation mode. In the automatic speed shifting mode, the controller 9 changes the target rotational frequency based on the magnitude of the load imposed on the motor 20. In the constant rotation mode, the controller 9 changes the target rotational frequency based on operation by the operator. The automatic speed shifting mode includes more stages to change the target rotational frequency than the constant rotation mode. In other words, if the metal blade 4a is attached to the driver 3, the target rotational frequency is changed in five stages in the automatic speed shifting mode, whereas the target rotational frequency is changed in three stages in the constant rotation mode. This facilitates the grass cutter 1 to rotate the motor 20 at the suitable rotational frequency in accordance with the magnitude of the load in the automatic speed shifting mode, and reduces the trouble of selecting the commanded rotational frequency in the constant rotation mode for the operator.

In the aforementioned embodiment, the grass cutter 1 corresponds to one example of the electric working machine of the present disclosure. The first and the sixth increase current thresholds THu1, Thu6 correspond to one example of the load imposed threshold of the present disclosure.

The first to the fourth, the sixth, and the seventh increase confirmation times Tu1 to Tu4, Tu6, Tu7 and the first to the fourth, the sixth, and the seventh reduction confirmation times Td1 to Td4, Td6, Td7 correspond to one example of the change confirmation time of the present disclosure. The first to the fourth, the sixth, and the seventh mask times Tm1 to Tm4, Tm6, Tm7 correspond to one example of the change disabled time of the present disclosure. The first to the fourth, the sixth, and the seventh increase conditions and the first to the fourth, the sixth, and the seventh reduction conditions correspond to one example of the condition for change of the present disclosure.

The automatic speed shifting mode corresponds to one example of the automatic shifting control of the present disclosure. The constant rotation mode corresponds to one example of the manual shifting control of the present disclosure.

An embodiment of the present disclosure has been described above. Nevertheless, the present disclosure is not limited to the aforementioned embodiment and may be modified in various ways.

For example, the present disclosure is applied to the grass cutter 1 in the aforementioned embodiment, but may be also applied to, for example, a multi-tool, and a lawn mower.

In the aforementioned embodiment, the duty ratio of each of the PWM signals is calculated based on the feedback control. However, the duty ratio may be calculated using a map or an arithmetic expression indicating the correspondence between the target rotational frequency and the duty ratio.

In the aforementioned embodiment, the type of the tool 4 is identified based on the motor current value Imt, and the target rotational frequency of the motor 20 is accordingly set. However, the target rotational frequency of the motor 20 may be set based on identification information of the tool 4 inputted into the grass cutter 1 by the operator.

In addition to the metal blade 4a and the nylon cord cutter 4b, a plastic (or resin) blade may be selected as the tool 4.

Functions of one component in the aforementioned embodiments may be achieved by two or more components, and a function of one component may be achieved by two or more components. Moreover, functions of two or more components may be achieved by one component, and a function achieved by two or more components may be achieved by one component. Furthermore, a part of the configurations of the aforementioned embodiments may be omitted. At least a part of the configurations of the aforementioned embodiments may be added to or replaced with other configurations of the aforementioned embodiments.

In addition to the above-described grass cutter 1, the present disclosure can be achieved in various forms, for example, a system including the grass cutter 1 as a component, a program for a computer to achieve a function of the grass cutter 1, a non-transitory tangible storage medium, such as a semiconductor memory, that stores the program, and a method for controlling an electric working machine.

What is claimed is:

1. A grass cutter comprising:
a driver configured such that a metal blade and a nylon cord cutter are selectively attached thereto;
a motor configured to drive the metal blade or the nylon cord cutter attached to the driver; and
a control circuit configured to control the motor to rotate at a target rotational frequency, the control circuit being configured to identify which one of the metal blade and the nylon cord cutter is attached to the driver based on a value of an electric current flowing through the motor, the control circuit being configured to set the target rotational frequency to a first maximum rotational frequency in response to the metal blade being attached to the driver, the control circuit being configured to set the target rotational frequency to a second maximum rotational frequency in response to the nylon cord cutter being attached to the driver, and the first maximum rotational frequency being higher than the second maximum rotational frequency.

2. An electric working machine comprising:
a driver configured such that individual tools of a plurality of types of grass cutting tools can be selectively attached to the driver;
a motor configured to drive an individual tool of the plurality of types of grass cutting tools that is attached to the driver; and
a control circuit configured to:
identify a tool type of the individual tool from the plurality of types of grass cutting tools based on a load or a current of the motor when the driver is driven by the motor with the individual tool attached to the driver;
set a target rotational frequency based on an identification of the tool type; and
control the motor to rotate at the target rotational frequency.

3. The electric working machine according to claim 2, wherein the target rotational frequency corresponds to a maximum rotational frequency of the motor for the tool type.

4. The electric working machine according to claim 2, wherein the control circuit is configured to change the target rotational frequency in accordance with a load imposed on the motor.

5. The electric working machine according to claim 4, wherein the control circuit is further configured to:
detect the load imposed on the motor; and
set the target rotational frequency upon detection of the load, the target rotational frequency being determined depending on the identification of the tool type.

6. The electric working machine according to claim 4, wherein the control circuit is further configured to:
detect the load imposed on the motor; and
set the target rotational frequency prior to detection of the load, the target rotational frequency being determined depending on the identification of the tool type.

7. The electric working machine according to claim 4, wherein the control circuit is configured to change the target rotational frequency in a stage-by-stage manner in accordance with the load imposed on the motor.

8. The electric working machine according to claim 7, wherein a total number of stages to change the target rotational frequency varies depending on the tool type.

9. The electric working machine according to claim 8, wherein the tool type can be a metal blade or a nylon cord cutter, and
wherein the total number of stages for the metal blade is larger than the total number of stages for the nylon cord cutter.

10. The electric working machine according to claim 4, wherein the control circuit is configured to perform automatic shifting control and manual shifting control,
wherein the control circuit is configured to change the target rotational frequency in the automatic shifting control based on a magnitude of the load, and
wherein the control circuit is configured to change the target rotational frequency in the manual shifting control based on operation of the electric working machine by a user of the electric working machine.

11. The electric working machine according to claim 10, wherein the automatic shifting control includes more stages to change the target rotational frequency than the manual shifting control.

12. The electric working machine according to claim 2, wherein the control circuit is configured to identify the tool type based on an electric current flowing through the motor.

13. An electric working machine comprising:
a driver configured such that a tool can be attached to the driver;
a motor configured to drive the tool attached to the driver; and
a control circuit configured to (i) set a target rotational frequency based on an identification of the tool as a metal blade or a nylon cord cutter and (ii) control the motor to rotate at the target rotational frequency, wherein
the target rotational frequency corresponds to a maximum rotational frequency of the motor for the tool, and
the maximum rotational frequency for the metal blade is higher than the maximum rotational frequency for the nylon cord cutter.

14. An electric working machine comprising:
a driver configured such that individual tools of a plurality of types of grass cutting tools can be selectively attached to the driver;
a motor configured to drive an individual tool of the plurality of types of grass cutting tools that is attached to the driver; and
a control circuit configured to (i) set a target rotational frequency based on an identification of a tool type of the individual tool, (ii) control the motor to rotate at the target rotational frequency, (iii) change the target rotational frequency in accordance with a load imposed on the motor, and (iv) set at least one parameter based on the identification of the tool type, the at least one parameter being associated with a change of the target rotational frequency depending on a state of the load.

15. The electric working machine according to claim 14, wherein
the tool type can be a metal blade or a nylon cord cutter,
the at least one parameter includes a load imposed threshold for determining whether the load is imposed on the motor, and
the load imposed threshold set when the nylon cord cutter is attached to the driver is larger than the load imposed threshold set when the metal blade is attached to the driver.

16. The electric working machine according to claim 14, wherein
the tool type can be a metal blade or a nylon cord cutter,
the at least one parameter includes a change confirmation time,
the control circuit is configured to change the target rotational frequency in response to a condition for change continuing for the change confirmation time, the condition for change being set based on a magnitude of the load, and
the change confirmation time set when the metal blade is attached to the driver is longer than the change confirmation time set when the nylon cord cutter is attached to the driver.

17. The electric working machine according to claim 14, wherein
the tool type can be a metal blade or a nylon cord cutter,
the at least one parameter includes a change disabled time,
the control circuit is configured to determine whether a condition for change is fulfilled in response to an elapse of the change disabled time, the condition for change being set based on a magnitude of the load, and
the change disabled time set when the metal blade is attached to the driver is longer than the change disabled time set when the nylon cord cutter is attached to the driver.

18. An electric working machine comprising:
a driver configured such that individual tools of a plurality of types of grass cutting tools can be selectively attached to the driver;
a motor configured to drive an individual tool of the plurality of types of grass cutting tools that is attached to the driver; and
a control circuit programmed to:
identify a tool type of the individual tool from the plurality of types of grass cutting tools based on a load or a current of the motor when the driver is driven by the motor with the individual tool attached to the driver;

set a target rotational frequency based on an identification of the tool type; and
control the motor to rotate at the target rotational frequency.

* * * * *